United States Patent [19]

Balleys et al.

[11] 4,367,390

[45] Jan. 4, 1983

[54] DEVICE FOR PASSING AN ELECTRIC CURRENT BETWEEN AN ELECTRODE WORKPIECE AND AN ELECTRODE TOOL

[75] Inventors: François Balleys; Roger Delpretti, both of Vernier, Switzerland

[73] Assignee: Ateliers des Charmilles, S.A., Geneva, Switzerland

[21] Appl. No.: 109,127

[22] Filed: Dec. 31, 1979

Related U.S. Application Data

[63] Continuation of Ser. No. 884,255, Mar. 7, 1978, abandoned.

[30] Foreign Application Priority Data

Mar. 11, 1977 [CH] Switzerland ............ 3088/77

[51] Int. Cl.$^3$ .............................. B23P 1/02
[52] U.S. Cl. ............................ 219/69 W; 219/69 C
[58] Field of Search ................ 219/69 W, 69 C, 69 M

[56] References Cited

U.S. PATENT DOCUMENTS 3,496,321 2/1970 Lobur ..................... 219/69 C
3,590,317 6/1971 Sennowitz ................ 219/69 C
4,205,212 5/1980 Ullmann et al. ........... 219/69 W

*Primary Examiner*—C. C. Shaw
*Attorney, Agent, or Firm*—Hauke and Patalidis

[57] ABSTRACT

A device for applying electrical current and voltage pulses between an electrode workpiece and an electrode tool, in the form of a wire or ribbon, in a travelling wire EDM apparatus, wherein a pulse generator providing such current and voltage pulses is connected across the electrodes. The travelling wire electrode is supported and guided by a pair of support and guide members and the pulse generator is connected across one of the support and guide members of the travelling wire electrode and the workpiece. A capacitor is connected across two contact members one engaged with the travelling wire electrode and the other with the workpiece, and is supported by one of the travelling wire support and guide members. The effect of the capacitor connected directly across the machining gap is to reduce considerably to a negligible value the inductance of the electrical circuit applying the current and voltage pulses across the electrodes.

2 Claims, 1 Drawing Figure

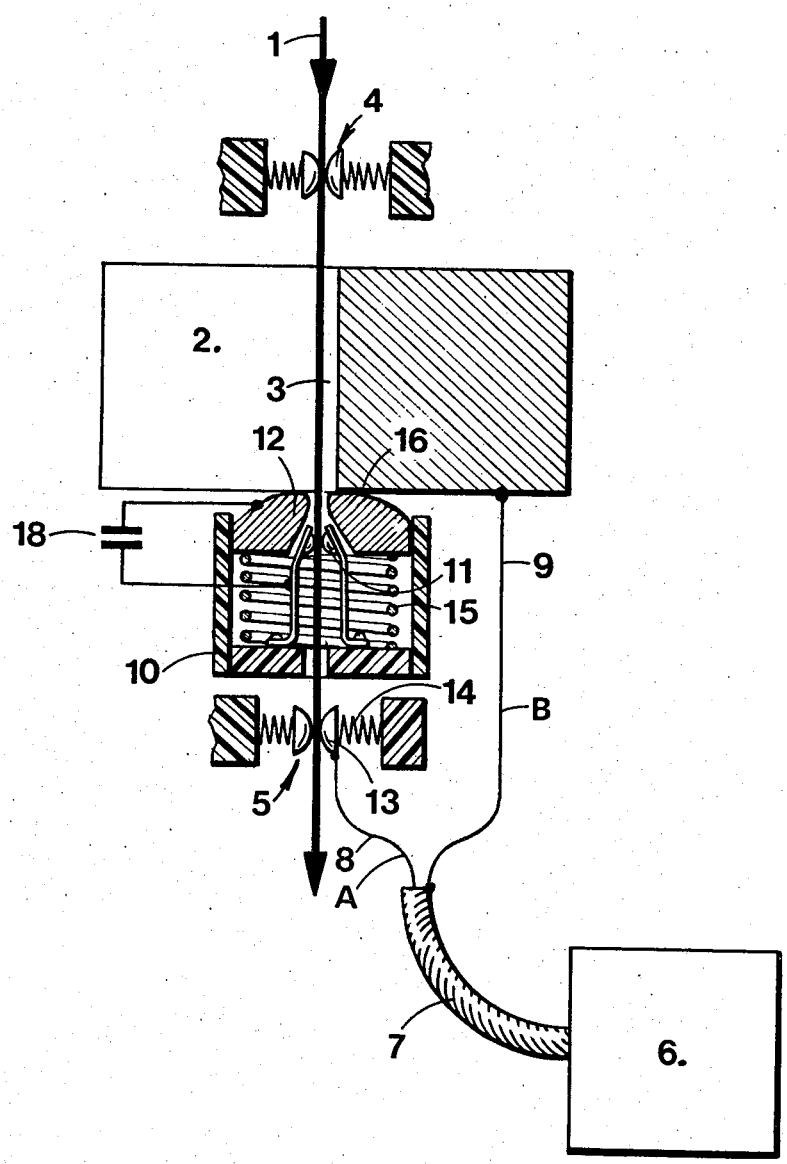

DEVICE FOR PASSING AN ELECTRIC CURRENT BETWEEN AN ELECTRODE WORKPIECE AND AN ELECTRODE TOOL

This is a continuation of application Ser. No. 884,255, filed Mar. 7, 1978 now abandoned.

The present invention relates to a device for supplying an electric current to an electrode workpiece and to an electrode tool, in the form of a wire or ribbon, in an electric spark erosion machine generally referred to as "Travelling wire" EDM apparatus.

In machines of this type, the electrode wire, which is guided between two guide members, is displaced with respect to the workpiece to be cut along a trajectory determined by an automatic control system or by a copying system from a design drawing or a template. The wire tool and the workpiece to be machined, between which circulates a machining fluid, are connected respectively to the terminals of a pulse generator, in a manner to produce successive discharges in the machining zone formed between the wire and the workpiece.

To attain a high cutting speed, the pulse generators of these machines produce discharges of short duration and at a high current level with the greatest possible frequency, the wear of the tool not being involved in the control process since the wire is continuously being renewed in the machining zone. Generally, the electric current is brought to the wire by sliding contacts, disposed near guiding the members for the wire, and each connected to one of the terminals of the pulse generator, the other terminal of this generator being connected directly to the workpiece to be machined by means of a flexible connection. This arrangement, which is necessary because of the relative displacement of the wire with respect to the workpiece, has the disadvantage of circulating the machining current in an electrical circuit, the inductance of which has a non-negligible effect in the presence of a current pulsed at high frequency.

The coefficient of self-inductance of this circuit is sufficient to reduce the peak value of the current pulses provided by the pulses generator and limit the frequency of these pulses, which has the effect of reducing the erosive yield of machining.

The object of the device forming the subject of the invention is to seek to avoid this disadvantage.

SUMMARY

According to the present invention there is provided a device for passing an electric current between an electrode workpiece and an electrode tool, in the form of a wire or ribbon, in a machine for cutting by electric spark erosion, wherein a pulse generator is connected to said electrodes, characterized in that a capacitor is carried by a support connected to a wire guiding member and located in the immediate vicinity of the machining zone, said support being provided with two guide pieces connecting the capacitor terminals respectively to the electrode tool and to the electrode workpiece.

As the capacitor is placed in the immediate proximity of the wire and of the workpiece, the resistance and the inductance of the discharge circuit are practically negligible, which permits producing discharges of very short duration and of high level with a high repetition frequency in the machining zone.

The new device of the invention permits an increase in the machining speed by 25 to 40% with respect to that obtained with the usual connecting system and is particularly well adapted to the case where the amplitude of the relative displacements of the wire and of the workpiece is large.

The present invention will be described further, by way of example, with reference to the accompanying drawing.

BRIEF DESCRIPTION OF THE DRAWING

The sole FIGURE of the drawing illustrates, schematically, a structure according to the present invention.

DETAILED DESCRIPTION OF THE PREFERRED EMBODIMENT

An electrode wire 1 is displaced with respect to an electrode workpiece 2, so as to maintain a predetermined sparking distance 3, between the wire 1 and the workpiece 2 when following a cutting trajectory determined by a digital control system or by a copying system from a drawing or a template not shown. The wire 1 is displaced axially during machining through guide members 4 and 5 by a driving system, not shown.

The wire 1 and the workpiece 2 are connected to a pulse generator 6 by a coaxial cable 7 the output terminals A and B of which are respectively connected to the wire 1 and the workpiece 2 by means of flexible cables 8 and 9.

Electric current is supplied to the wire 1 by means of a metallic member 13 maintained in contact with the wire 1 by a spring 14. The current circulates in a loop constituted by the cable 8, the lower part of the wire 1, the workpiece being machined 2 and the cable 9. The presence of inductance and the circuit losses constituted by said loop is avoided by the arrangement described hereinafter.

A support 10, made of insulating material, is fastened to one of the guide devices 4 and 5 and is provided with two contact members 11 and 12 insulated from each other and cooperating respectively with the wire 1 and the workpiece 2. The contact member 12 is annular shaped and is coaxially disposed around the wire 1, and is prressed against the lower face 16 of the workpiece 2 by a spring 15. The contact members 11 and 12 are respectively connected to the terminals of a capacitor 18 which is thus connected across the wire 1 and workpiece 2 in the immediate vicinity of the machining zone, therefore with very short leads.

At the beginning of each pulse supplied by the generator 6, the capacitor 18 is charged. The inductance of the charging circuit of the capacitor 18 does not affect the operation of the circuit, as this inductivity is low and the time interval between two successive pulses is quite sufficient for charging the capacitor. When the spark jumps betwen the wire 1 and the workpiece 2, the effective power supply is the capacitor 18, so that the inductance of the circuit for the machining current is as low as possible. Consequently, very short discharges of high intensity are obtained.

In order to obtain the test performance of the circuit, a second capacitor connected to two guide pieces could be placed on the other side of the workpiece in the immediate vicinity of the machining zone. In this manner, each end of the operating portion of the wire 1 could be connected through a capacitor to the workpiece 2.

We claim:

1. In a device for passing an electric current in a machining zone between an electrode workpiece and an electrode tool in a spark erosion machine, wherein said electrode tool is in the form of a travelling wire or ribbon supported by a pair of spaced apart guide members and wherein a pulse generator is connected across said electrodes, the improvement comprising an auxiliary capacitor separate from said pulse generator and carried by a support displaceable with one of the guide members located in the immediate vicinity of the machining zone, said support being provided with two sliding electrically conductive contact members electrically insulated from each other, wherein one of said sliding contact members is in engagement with said electrode tool in the form of a wire or ribbon and the other is in engagement with said electrode workpiece, said contact members are in close proximity to each other and disposed one within the other substantially coaxially, and the capacitor is connected across said contact members by substantially short leads such as to be connected directly across the electrode tool and the electrode workpiece by substantially short electrical connections.

2. The improvement of claim 1 wherein said sliding contact member in engagement with an electrode workpiece is annular-shaped and is engaged by a spring against said workpiece.

* * * * *

UNITED STATES PATENT AND TRADEMARK OFFICE
CERTIFICATE OF CORRECTION

PATENT NO. : 4,367,390
DATED : January 4, 1983
INVENTOR(S) : Francois Balleys et al It is certified that error appears in the above-identified patent and that said Letters Patent are hereby corrected as shown below:

Col. 2, line 44, before "is" insert --it--,
correct the spelling of "pressed".

Signed and Sealed this

Second Day of October 1984

[SEAL]

Attest:

GERALD J. MOSSINGHOFF

Attesting Officer — Commissioner of Patents and Trademarks